United States Patent [19]

Wenzel et al.

[11] 4,094,842

[45] June 13, 1978

[54] DISPERSING SOLID POLYURETHANE PREPOLYMERS INTO WATER

[75] Inventors: Wolfgang Wenzel; Dieter Dieterich, both of Leverkusen, Germany

[73] Assignee: Bayer Aktiengesellschaft, Leverkusen, Germany

[21] Appl. No.: 727,088

[22] Filed: Sep. 27, 1976

[30] Foreign Application Priority Data

Sep. 26, 1975 Germany ............................. 2543091

[51] Int. Cl.$^2$ ....................... C08J 3/04; C08G 18/12; C08J 3/24; C08G 18/82
[52] U.S. Cl. .................. 260/29.2 TN; 260/77.5 AM; 260/77.5 AQ; 260/77.5 A; 260/77.5 Q; 428/425
[58] Field of Search ............... 260/29.2 TN, 77.5 AM

[56] References Cited

U.S. PATENT DOCUMENTS

| 2,948,691 | 8/1960 | Windemuth et al. | 260/29.2 TN |
|---|---|---|---|
| 3,250,745 | 5/1966 | Davis et al. | 260/29.2 TN |
| 3,384,606 | 5/1968 | Dieterich et al. | 260/29.2 TN |
| 3,756,992 | 9/1973 | Dieterich | 260/77.5 Q |
| 3,905,929 | 9/1975 | Noll | 260/29.2 TN |
| 3,923,713 | 12/1975 | Hermann | 260/29.2 TN |
| 3,935,146 | 1/1976 | Noll et al. | 260/29.2 TN |
| 3,988,278 | 10/1976 | Bartizal | 260/29.2 TN |

FOREIGN PATENT DOCUMENTS

| 1,146,890 | 3/1969 | United Kingdom | 260/29.2 TN |

OTHER PUBLICATIONS

Dieterich et al. Advances in Urethane Science & Technology vol. 4, Technomic Publishing Co. Westport (Conn., USA) pp. 112-131.
DOS 1,595,687-Bayer A/G, Sep. 4, 1969.

*Primary Examiner*—H.S. Cockeram
*Attorney, Agent, or Firm*—Gene Harsh; Lawrence S. Pope

[57] ABSTRACT

This invention relates to a novel process for the production of polyurethane via an intermediate stage of aqueous dispersions of oligomeric polyurethane prepolymers having ionic and/or non-ionic hydrophilic groups which ensure their dispersibility in water, followed by conversion of these water-dispersible oligomers into cross-linked high molecular weight sheets.

9 Claims, No Drawings

DISPERSING SOLID POLYURETHANE PREPOLYMERS INTO WATER

BACKGROUND OF THE INVENTION

Processes for the production of stable, aqueous polyurethane-polyurea dispersions are already known and are described for example in German Federal Pat. Nos. 1,184,946 and 1,178,586; German Auslegeschrift No. 1,237,306; German Offenlegungsschrifts Nos. 1,495,745; 1,595,602; 1,770,068; 2,019,324 and 2,314,512 and U.S. Pat. Nos. 3,388,087; 3,480,592; 3,461,103 and 3,686,108; see also D. Dieterich et al., Angew. Chem. 82, 53 (1970). The dispersions described in the literature mentioned above are prepared on the principle of incorporating hydrophilic centers into a macromolecular chain of a polyurethane (polyurea) molecule. In the known dispersions, these hydrophilic centers or so-called internal emulsifiers are ionic groups or ether functions. The groups are either incorporated in the prepolymer in the form of special diols or used as modified amines for chain lengthening the prepolymers which have each at least two isocyanate functions in end positions.

Various processes for preparing the known dispersions have been described, for example in D. Dieterich and H. Reiff, Angew. makromol. Chemie 26, 85 (1972). The method employed generally consists of either converting the solution of a polyurethane in an organic solvent into an aqueous dispersion or of dispersing a liquid prepolymer stage with or without solvent in water. For example, a liquid prepolymer ionomer containing isocyanate groups may be introduced into water with vigorous stirring to form an emulsion of the prepolymer which then continues to react with water or a diamine or polyamine to undergo chain lengthening to a high molecular weight polyurethane urea.

One method of dispersion which is particularly simple to carry out has been described in German Offenlegungsschrift No. 1,913,271 and/or U.S. Pat. No. 3,756,992. According to this method, a solution or liquid polyurethane polyelectrolyte which is capable of undergoing an addition reaction with formaldehyde to form methylol groups is dispersed by mixing it with water and is converted into a polyurethane polyelectrolyte containing methylol groups by the addition of formaldehyde or formaldehyde derivatives. This polyurethane polyelectrolyte is then condensed either in the dispersion or on a substrate to form high molecular weight polyurethane.

The dispersion is prepared by adding water to the stirrable melt until the water forms the continuous phase, the mixture generally first passing through the stage of a water-in-oil emulsion. Alternatively, a water-in-oil emulsion may be prepared at elevated temperature and left to cool, until it changes into an oil-in-water emulsion. The preparation of the dispersion is almost always carried out at elevated temperature, preferably at between 50° C and 120° C. This is necessary, first, because the viscosity of the prepolymer stage which is to be dispersed is too high at room temperature so that dispersion at room temperature would require elaborate apparatus such as screw extruders, and secondly, because dispersion generally proceeds more rapidly with increasing temperature. The dispersion of solvent-free melts of isocyanate prepolymers is also nearly always carried out at elevated temperature.

Although the method described above is economically very advantageous compared with the preparation of dispersions from solutions and can be achieved with very simple means, it does not meet all of the practical requirements. For example, nonionic dispersions are impossible or at least very difficult to prepare by this method because the dispersibility of polyurethane prepolymers containing hydrophilic polyether groups decreases with increasing temperature. This means that if dispersion is to be carried out at the necessary elevated temperatures, the polyurethane prepolymers must be rendered more hydrophilic than is necessary for the subsequent stability of the dispersion. The resistance of the product to water is thereby adversely affected. On the other hand, the preparation of polyurethanes modified by hydrophilic ether groups would be desirable because such dispersions have a high resistance to frost.

The usual ionomer dispersions are generally insufficiently frost resistant so that their storage and transport in cold weather are expensive because they require heated storage rooms. In addition, the transport of aqueous dispersions over long distances is in any case unsatisfactory because the transport of large quantities of water is inevitably expensive.

There is, therefore, an urgent need for the manufacturers using the product to be able to prepare their own dispersions from the solid materials and water in much the same way as they normally prepare their own organic solutions.

The known redispersible powders are a step in this direction. The manufacture of these powders is technically complicated and economically not of advantage because the powders are produced from a ready-made dispersion which has to be converted into powder by a cost intensive process of freeze drying or spray drying as described in German Auslegeschrift No. 1,729,201. It would, therefore, be desirable to have a process for the production of a solid material which is stable in storage and could be converted to an aqueous dispersion at a later date without having to pass through the complicated aqueous dispersion stage described above.

The full economic advantage of using polymers from the aqueous phase could then be obtained.

The solution to this problem has in the past generally been regarded as fundamentally impossible because dispersions, being metastable diphasic systems, cannot spontaneously be produced by a solution process but, on the contrary, tend to separate irreversible solids under the influence of chemical or physical changes, and for this reason the stabilization of dispersions is commercially of great importance. It is in fact true, as is well known to any expert in the field, that coatings deposited from dispersions are generally impossible to reconvert into a dispersion by the action of water. The commercial applications of dispersions are based on this impossibility of simple redispersion. Exceptions are highly hydrophilic dispersion coatings, but these have no commercial importance on account of their insufficient resistance to water.

It has now surprisingly been found that certain solid prepolymer stages of polyurethane dispersions are spontaneously converted into stable dispersions by contact with water at temperatures below their softening range so that lumps or coarse powders of such solid prepolymer stages can be so to speak "dissolved" or converted to dispersions by introducing them into water or pouring water over them. Dispersions of such prepolymers nevertheless form completely water resistant, high quality films and coatings when chain lengthened with cross-linking agents.

SUMMARY OF THE INVENTION

The present invention relates to a process for the production of polyurethanes from oligomeric prepolymers which are free from isocyanate groups and cross-linking agents, characterized in that solid oligomeric prepolymers which are free from isocyanate groups and stable in storage and are synthesized from (a) diisocyanates and/or triisocyanates to which monoisocyanates may be added and (b) compounds having at least one group which is capable of undergoing an addition reaction with isocyanate groups, component (a) or (b) consisting of or including compounds containing ionic groups and/or groups capable of conversion into ionic groups and/or hydrophilic units of the formula $-CH_2-CH_2-O-$ and, optionally, also including compounds which, in addition to containing at least one group capable of reacting with isocyanate groups, contain reactive groups which do not react with isocyanate groups under the reaction conditions, but are capable of undergoing a cross-linking reaction with a cross-linking agent, and moreover the nature and quantity of the components being chosen so that the prepolymers (i) have an average molecular weight of less than about 20,000 and (ii) contain from about 4 to 120 milliequivalents per 100 g of prepolymer of ionic groups or groups capable of conversion into ionic groups and/or from about 2 to 20% by weight of units of the formula $-CH_2-CH_2-O-$ are introduced into water in the form of lumps or coarse powders or have water poured over them in this form at a temperature below the softening range of the prepolymer, and any groups may, if desired, be at least partly converted into ionic groups in known manner before, during or after the prepolymer is brought into contact with water, the dispersion which is thereafter formed spontaneously and which is stable in storage being applied to a substrate and dried, a suitable cross-linking agent being added before, during or after application of the dispersion so as to ensure cross-linking of the sheet finally obtained.

DETAILED DESCRIPTION OF THE INVENTION

Drying of the dispersion is preferably carried out in the presence of the cross-linking agent at temperatures of between about 40° C and 180° C. As can be seen from the formulation given above, the ionic groups may also be formed by incorporating in the prepolymer the appropriate groups which can be converted into ionic groups, that is to say in particular tertiary amino groups, carboxyl groups or sulphonic acid groups, which are then partly converted to the corresponding ionic groups by quaternization (of tertiary amino groups) or perferably neutralization, before, during or after, preferably after, the prepolymer is brought into contact with water. In theory, therefore, it would be possible first to prepare a prepolymer having tertiary amino groups, carboxyl groups or sulphonic acid groups and then to convert the potential ionic groups into ionic groups by the appropriate reaction in the absence of water and finally to bring the product into contact with water. Alternatively, said prepolymers containing potential ionic groups may first be reacted with water and only subsequently with the appropriate neutralizing agent. Conversion of the potential ionic groups is, however, preferably carried out during the dispersion process using water or an aqueous solution with a pH below 6 for dispersing a basic prepolymer and an aqueous solution with a pH above 8 for dispersing a prepolymer having acid groups.

The prepolymers used are in part already known. They consist of the usual polyurethanes and polyurethane ureas built up from the known starting components normally used for the synthesis of polyurethanes. The only condition to be observed is that the calculated molecular weight of the polyurethane prepolymers should be below about 20,000, in particular below about 10,000. This means that the equivalent ratio of isocyanate groups to active hydrogen atoms employed should generally be less than about 1 and preferably less than about 0.9. Moreover, the reaction products should be solid at room temperature and capable of being broken down into lumps or powders. Furthermore, the products should contain from about 4 to 120 milliequivalents per 100 g of prepolymer of ionic groups or groups capable of conversion into ionic groups and/or from about 2 to 20% of groups of the general formula $-CH_2-CH_2-O-$. An important precondition for the dispersibility of the prepolymers is that they must contain from about 4 to 120 milliequivalents per 100 g of prepolymer of ionic groups and/or about 2 to 20% by weight of ethylene oxide units. If, therefore, prepolymers which are free from ethylene oxide units and contain only potential ionic groups are first prepared, these potential ionic groups must be converted into ionic groups as described above. Alternatively, one could, for example, prepare a prepolymer which contains potential ionic groups such as tertiary amino groups and ethylene oxide units. Such a prepolymer would be capable of being dispersed without conversion of the tertiary amino groups into the corresponding ammonium groups if the ethylene oxide content is within the range mentioned above. Conversion of potential ionic groups into ionic groups is, therefore, essential only if the prepolymer contains no other groups which render it dispersible. It is undesirable to combine a maximum quantity of ionic groups with a maximum quantity of ethylene oxide groups since the hydrophilic character of the prepolymer is then too high for most practical purposes. Prepolymers which may be used in the process according to the invention are, therefore, those in which the hydrophilic groups consist exclusively of ionic groups or exclusively of ethylene oxide units or of a combination of less than the maximum quantity of ionic groups and ethylene oxide units. The last two mentioned variations are preferred. Particularly preferred prepolymers for the process according to the invention contain from about 4 to 30 milliequivalents per 100 g of prepolymer of (potential) ionic groups, and from about 3 to 17% by weight of ethylene oxide units $-CH_2-CH_2-O-$. The prepolymers are otherwise built up in known manner from the usual starting components such as polyesters, polyethers, polyisocyanates, low molecular weight polyols and chain lengthening agents. It should be particularly mentioned that it is advantageous also to use trifunctional and polyfunctional as well as monofunctional reactants, branched prepolymers being thereby obtained. Polyesters and polyethers should not be used, when synthesizing polyurethane prepolymers having an average molecular weight of less than about 800. Since the molecular weight is required to be below about 20,000 and preferably below about 10,000, premature cross-linking is unlikely to take place when this method is adopted.

In addition to urethane groups which are in any case present, the prepolymers preferably also contain other reactive groups capable of undergoing a cross-linking reaction, and these groups are preferably situated in end positions. The incorporation of these reactive groups may suitably be achieved by using compounds which, in addition to containing at least one isocyanate group or preferably at least one isocyanate reactive group, also contain a reactive group which is capable of undergoing a cross-linking reaction. Such reactive groups capable of cross-linking reactions include groups which are reactive with isocyanate groups, for example hydroxyl groups, primary and secondary amino groups and carboxyl groups, but they also include reactive groups which do not react with isocyanates under the reaction conditions according to the invention but are capable of a cross-linking reaction with certain cross-linking agents. Incorporation of the first mentioned reactive groups which are capable of a cross-linking reaction can easily be achieved by carrying out the process according to the invention using polyhydroxyl compounds, polyamines, polycarboxylic acids, amino alcohols, hydroxycarboxylic acids or aminocarboxylic acids in quantities corresponding to an equivalent ratio of isocyanate groups to groups which are reactive with isocyanate groups of less than 1. Prepolymers containing the above mentioned reaction groups are then automatically obtained. (Although carboxyl groups and primary and secondary amino groups also constitute "potential ionic groups" as mentioned above, they need not necessarily be converted into ionic groups).

The process according to the invention, however, is preferably carried out using compounds which at a first approximation are monofunctional for the purpose of the isocyanate addition reaction and which in addition to the group which is reactive with isocyanate groups contain another reactive group which is not reactive with isocyanate groups under the reaction conditions of the process according to the invention or under the conditions of the addition reaction leading to the oligourethane. Compounds of this kind are in particular compounds of the formula Y—X—NHR such as those described in U.S. Pat. No. 3,756,992, incorporated herein by reference. In this formula, Y may represent, for example, an OH, NH$_2$, NH—R$_1$ (R$_1$ = C$_1$-C$_4$-alkyl), SH, COOH, CONH$_2$, CSNH$_2$, CO—NH—NH$_2$, NH—CO—NH$_2$, NH—CS—NH$_2$ or NH—NH$_2$ group. X may represent, for example a CO, CS, SO$_2$, NR—CO, NR—CS, O—CO, S—CO, O—SO$_2$, CNR, NR—CNR, CO—NR—CO or CS—NR—CS group. R represents, preferably, hydrogen or an alkyl or alkenyl group containing 1 to 4 carbon atoms which may be substituted by an OH, OCH$_3$, OC$_2$H$_5$, CCl$_3$, COOH or SO$_3$H group. R may also represent a CN, COR' or SO$_2$R' group when R' represents an alkyl, alkenyl, alkoxy or carboxyalkyl group with 1 to 4 carbon atoms. These compounds of the formula Y—X—NHR may belong, for example, to the following classes of compounds: Ureas, aminoalcohols, sulphamides, semicarbazides, guanidines, oxamidines, biurets, sulphonylureas, hydrazodicarbonamides, urethanes, cyanamides, acid amides, cyanuric acid amides, imidazolidones, tetrahydropyrimidones, hexahydropyrimidones, urones, hexahydro-1,3,5-triazinones and the corresponding thio compounds. These two groups may also be the same as can be seen from the definition of the groups Y and NHR. Even in that case (for example urea) the compounds may still be at a first approximation monofunctional for the purpose of the isocyanate addition reaction since urea, for example, first reacts with 1 isocyanate group to form the biuret which is then much less reactive for a further addition reaction with another isocyanate group.

The ionic groups or groups capable of conversion into ionic groups may be introduced into the prepolymers used according to the invention in known manner by using compounds which, in addition to ionic groups or groups capable of conversion into ionic groups, contain isocyanate groups or, preferably, groups which are reactive with isocyanate groups, for example the compounds described in great detail in U.S. Pat. No. 3,756,992, incorporated herein by reference.

The ethylene oxide units which are preferably present in the prepolymers used according to the invention are preferably introduced by including in the starting materials for the prepolymers diols having polyalkylene oxide side chains according to German Offenlegungsschrift No. 2,314,512 and/or diisocyanates having polyalkylene oxide side chains according to German Offenlegungsschrift No. 2,314,513, and U.S. Pat. No. 3,920,598. In addition to the information given in said publications, however, it should be pointed out that, instead of using the diols or diisocyanates with polyethylene oxide side chains mentioned therein, one could also use diols or diisocyanates in which the polyalkylene oxide side chains contain other alkylene oxide units in addition to polyethylene oxide units, in particular propylene oxide units. The only essential feature is that the quantity of ethylene oxide units should at least be sufficient to ensure that the resulting prepolymer has the required ethylene oxide unit content indicated above. The particularly preferred non-ionic hydrophilic starting components used in the process according to the invention are represented by the formula

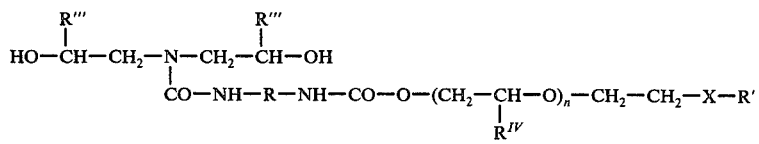

in which

R represents a divalent radical of the kind obtained by removal of the isocyanate groups from a diisocyanate having a molecular weight of from about 112 to 1000;

X represents oxygen or —NR"—;

R' and R" which may be the same or different, represent monovalent hydrocarbon groups with 1 to 12 carbon atoms, R''' represents hydrogen or a monovalent hydrocarbon group having 1 to 8 carbon atoms and n represents an integer of from 4 to 89 and R$^{IV}$ represents hydrogen or it may also partly, in accordance with the comments given above, represent a methyl group.

Another method of introducing ethylene glycol ether segments consists of using polyethers which contain a corresponding number of such segments or triethylene or tetraethylene glycol.

Synthesis of the prepolymers used according to the invention is carried out by methods well known in the art, for example the methods described in U.S. Pat. No. 3,756,992, but, in addition to or instead of the starting components mentioned therein which contain ionic groups or groups which are capable of conversion into ionic groups, the last mentioned starting components having non-ionic hydrophilic segments are used. It is essential for the process according to the invention that the oligourethane which is free from isocyanate groups should be solid at room temperature. This can be achieved, for example, by using preferably low molecular weight starting components for the synthesis of the oligourethanes so that the oligourethanes will contain a high concentration of urethane and/or urea groups which are capable of forming hydrogen bridges. The inclusion of higher than difunctional starting components and the consequent possibility of branching of the oligourethane molecule also helps to ensure that the oligourethanes will be solid at room temperature. Solid products are also obtained whenever an isocyanate prepolymer containing hydrophilic groups is first prepared and then reacted with a large excess of compounds of the formula Y—X—NHR, for example urea. For carrying out the process according to the invention, the solid oligourethane should be in the form of a block or in lumps or as a powder. It may be broken up mechanically in a mill, if desired, using agents which promote hardening such as dry ice or substances which prevent the solid lumps from sticking together, for example silicone additives or aerosols. It is not essential to pulverize the oligourethanes for carrying out the process according to the invention since even large lumps will undergo spontaneous dispersion when they are introduced into water or water is poured over them.

Another essential feature of the process according to the invention is the molecular weight of the oligourethane. This should preferably be between about 1000 and 10,000. In theory, prepolymers with an average molecular weight of between about 10,000 and 20,000 can also be dispersed even if with considerable difficulty. The molecular weight of the oligourethane can easily be adjusted in known manner by suitable choice of the nature and proportions of the starting components. Thus, for example, the use of a large isocyanate excess (by preparation of isocyanate prepolymers which are subsequently masked with monofunctional isocyanate reactive compounds) or the use of a quantity of isocyanate groups which is less than equivalent to the quantity of groups which are reactive with isocyanate groups prevents the formation of high molecular weight polyurethanes in the isocyanate polyaddition reaction. The formation of unwanted high molecular weight polyurethanes can also be prevented by using monofunctional starting components right at the beginning of the isocyanate polyaddition reaction.

The average molecular weight of the oligourethane can be calculated from the stoichiometric proportions of the reaction as described below.

Assuming that, for example, 2 mols of a dihydroxy compound with a molecular weight of 2000, 1 mol of a basic chain lengthening agent with a molecular weight of 119, 4.75 mol of diisocyanate (molecular weight 168) and 3.5 mol of urea (molecular weight 60) are reacted together to produce an oligourethane with two biuret end groups, then the molecular weight is calculated as follows:

$$MW = (2/3.5)(2 \times 2000 + 119 + 4.75 \times 168 + 3.5 \times 60) \approx 3000$$

Another essential feature for the process according to the invention is, as already explained above, the concentration of emulsifier built into the prepolymer. It is surprising that the aforementioned low concentration of ionic groups and/or ethylene oxide units is sufficient to ensure spontaneous dispersion of the solid in water. The ethylene oxide units may be linked together in the main chain or preferably, in the side chain or may be present in a block or distributed in the molecule.

In the past, a non-ionic melt dispersion containing polyethylene oxide segments as internal emulsifier was impossible to prepare or could only be prepared with great difficulties since in the processes previously employed, it was thought that dispersion of the melt could only be carried out at temperatures above the softening point of the solid while at temperatures higher than about 70° C ethylene oxide groups lose their character of rendering compounds hydrophilic. However, the new process makes it possible to prepare this interesting type of dispersion without using solvents or high speed stirrers.

The process according to the invention is extremely simple in practice. For example, the water required for dispersion is introduced into a reaction vessel, with or without cross-linking agent, and the prepolymer, for example in the form of a granulate or large lumps or coarse powder, is added with light stirring. Alternatively, lumps or a coarse powder of the prepolymer may first be introduced into the reaction vessel and the required quantity of water may be poured over it and the mixture may be stirred for a more rapid dispersion process. The proportion by weight of prepolymer to water used is generally between about 65 : 35 and 5 : 95 and preferably between about 55 : 45 and 20 : 80. Stirring is not essential. The process of dispersion can be achieved without any shearing forces although it will then require a longer time. If no stirrer apparatus is used, it is advisable to agitate the mixture from time to time or to stir it manually for a short time.

The temperature during the dispersion process should be below the softening point of the solid prepolymer so that the prepolymer will not cake together to form large lumps although if the prepolymer contains ionic groups the temperature may be raised towards the end of the dispersion process to speed up the process of dispersion.

It is essential to the process according to the invention that water will always form the continuous phase during the process of dispersion. Only then can the solid easily "dissolve" to a dispersion below its softening point. The softening point can be determined relatively accurately by a thermomechanical expansion analysis (TMDA). When the results are plotted on a graph, the substantially rectilinear expansion curve obtained shows a distinct kink at the softening point. This method may also be used for determining softening ranges, but differential thermoanalysis (DTA) is more suitable for this purpose. (R. Bonart, L. Morbitzer and H. Rinke, Kolloid-Z.u.Z. Polymere 240, 807 (1970); H. U. Herweig, ibid 211, 34 (1966)).

For "dissolving" the solid lumps could be stirred, water always forming the continuous phase.

Depending on the melting point of the prepolymer, the dispersion process may be carried out at temperatures of from about 1° to 150° C, preferably at about 20° to 70° C and most preferably at room temperature. It is generally carried out at temperatures below the melting point of the solid.

The dispersion process may be assisted by using emulsifiers, but they are not essential. Small quantities of solvents may also be used to assist dispersion.

Cross-linking agents must be added to the dispersion of the prepolymers in all cases. They may be added before, during or after application of the dispersion to a substrate. The cross-linking agents may belong to various classes of compounds, depending on the reactive groups present in the prepolymer. They may be soluble or dispersible in water or insoluble in water. If the cross-linking agents are water-soluble and react only slowly, for example formaldehyde or water-soluble resins containing methylol groups, they are frequently added before or during the process of dispersion. Water insoluble cross-linking agents are preferably only added after the prepolymers have been dispersed so that the emulsifying action of the prepolymer dispersion is utilized. Emulsifiers may, of course, be used to assist the incorporation of hydrophobic cross-linking agents, or the cross-linking agent may be converted into a dispersion with water in the usual manner before it is added to the prepolymer dispersion.

The proportion of dispersion to cross-linking agent used depends primarily on the number of reactive groups. In addition, it is desirable to add an excess of cross-linking agent, particularly if the cross-linking agent is one which is capable of reacting with itself, for example formaldehyde derivatives such as methylol ethers. Masked isocyanates are also capable of reacting with themselves if the isocyanate reaction sets in after removal of the masking group. Cross-linking agents which have been modified with polyurethanes may also be used. The proportion of mols of oligourethane to mols of cross-linking agent should preferably be between about 5 : 1 and 1 : 4.

The combination of functional groups in the uncross-linked oligourethane and cross-linking agent is of major importance for the cross-linking reaction. The following Table gives a summary of suitable combinations of functional groups and cross-linking agents.

| Functional groups in the uncross-linked polyurethane | Cross-linking agent |
|---|---|
| —CO—NH—, —NH—CO—NH—, —NH—NH—, OH, —NH$_2$, | Polyisocyanates, masked isocyanates, Uretdiones, formaldehyde, masked formaldehydes, methylolethers and the like, polyaziridines, divinyl sulphone |
| —N— | Quaternizing agents, polyacids |
| —S— | Quaternizing agents |
| —CH=CH$_2$ | Sulphur, S$_2$CL$_2$, optionally with vulcanization accelerators, peroxides, aliphatic azo compounds |
| —COOH, —SO$_3$H, —HPO$_4^\ominus$ | Polybases, oxides, hydroxides, carbonates of polyvalent metals |
| —NH$_2$, —COOH | Polyepoxides |
| >C—C< (epoxide) | Amines, carboxylic acids, mercaptans |

One suitable method of cross-linking consists of reacting epoxide groups (for example obtained by the reaction of the prepolymers having isocyanate end groups with glycidol) with dicarboxylic or polycarboxylic acids or diamines or polyamines. With these reactions it is possible to ensure that the epoxide group alone will be involved in the cross-linking mechanism.

Another method of including only certain groups in the cross-linking reaction consists of cross-linking polyurethanes with ternary nitrogen or binary sulphur by means of quaternizing agents such as p-xylylene dichloride in a reaction resulting in salt formation.

Much more important, however, are cross-linking reactions carried out with formaldehyde or its derivatives and with isocyanates. Both of these cross-linking reactions are based on the reactivity of Zerewitinoff-active hydrogen atoms.

Either free or mask diisocyanates or polyisocyanates may be used for isocyanate cross-linking. Masked isocyanates are generally used if the mixture containing the cross-linking agent is required to be stable in storage and to undergo a cross-linking reaction only during or after the removal of water. If, however, cross-linking is required to take place in the aqueous phase, the mixture should contain NHR groups wherein R is the same as defined earlier in the present application, which have a higher reaction velocity with isocyanates than the isocyanate-water reaction, and free isocyanates. The isocyanates may also be added immediately before removal of the water. This method may also be applied to other reactants.

In principle, any isocyanate or prepolymer containing isocyanate end groups may be combined with any dispersed prepolymer containing groups which are reactive with isocyanates, but an isocyanate-water reaction then frequently takes place.

One cross-linking agent which is particularly suitable for aqueous systems is formaldehyde which is capable of forming methylol groups with the Zerewitinoff active hydrogen atoms in the polyurethane molecule, these methylol groups subsequently splitting off water in the drying process to give rise to the cross-linked polyurethanes.

Aqueous solutions of compounds which release formaldehyde may be used instead of free formaldehyde, in particular paraformaldehyde, trioxane, methylal, hexamethylene tetramine, oligomethylol compounds such as dimethylol or oligomethylol ureas and dimethylol or oligomethylol hexahydropyrimidinones, urones, melamines and other triazine derivatives. Methylolethers may also be used.

Apart from formaldehyde, higher aldehydes such as acetaldehyde, chloral, croton aldehyde, acrolein, furfural, glyoxal, glutaric acid dialdehyde, ketones such as acetone, methyl ethyl ketone, cyclohexanone, and their condensates with aminoplas-forming compounds or mixed condensates with formaldehyde and aminoplast-forming compounds, may also be used.

The formaldehyde or other compound of the above mentioned group is generally stirred into the aqueous dispersion. A heat treatment may be carried out before removal of the water from the dispersion, for example the dispersion may be exposed to a temperature above about 50° C for a period of about 10 minutes to 48 hours, the time depending on the temperature and the pH. At pH values of from about 5 to 7 and temperatures of from about 50° to 80° C, the heat treatment must generally be continued for more than about 10 to 48 hours, whereas 10 minutes may be sufficient at about 140° C and about pH 2. At temperatures above about 120° C it is preferable to carry out the treatment in a pressure vessel.

According to one preferred method, the dispersion is stirred for about 1 to 4 hours at a reaction temperature of from about 70° to 110° C immediately after it has been prepared. The after-reaction which takes place at this stage is greatly accelerated by lowering the pH to a level between about 5 and 2, preferably about 4 to 3, for example by the addition of tartaric or phosphoric acid.

This after-treatment is particularly necessary if the dispersion is subsequently to be dried at room temperature and cannot be reheated, for example when it is used as a house paint.

In addition to or instead of this measure, the dispersions may be dried at elevated temperature. Temperatures below about 100° C are preferably employed because of the risk of bubble formation. The dispersions are in most cases previously adjusted to a pH between about 5 and 2 (preferably about 4 to 3) if they are not subsequently to be reheated at a higher temperature. This method is particularly suitable for continuous coating, laminating, bonding or lacquering operations in which drying is carried out rapidly in a drying channel.

The dispersion may, of course, also be converted into a gel-like consistency by the addition of substances such as thickeners or fillers or by increasing the solid content, and the gel may then be mixed with a melamine resin for example, and heated on the coated surface to cross-link it.

A particular advantage of the process according to the invention lies in the problem-free storage and transport, insensitivity to water and frost and storage stability of the solid prepolymer stages.

Polyurethane (urea) dispersions produced by the process according to the invention are suitable for various fields of application. They can be used for dressing leather, for example, or for coating various materials, including textiles. In this field, they may be used, for example, as top coats. Other important fields of application include the use of the products as adhesives or as lacquers. They may also be used in the field of glass fiber sizes, dispersing agents and impregnation for fibers and textiles, among others. The products may also be added to synthetic resin dispersions or used as binders, for example, for cork powder or woodmeal, glass fibers, asbestos, paper-like materials, plastics and rubber waste and ceramic materials.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

EXAMPLE 1

Starting materials:
280 g of polypropylene oxide ether started on bisphenol A (molecular weight: 570) (PA)
51.1 g of propoxylated adduct of 2-butenediol-(1,4) and sodium bisulphite (molecular weight: 425) (AD), 75% in toluene
131.9 g of hexamethylene-1,6-diisocyanate (H) 25.7 g of urea Method The diisocyanate (H) is added at 60° C to the polyether (PA) which has been dehydrated at 110° C and sulphonate diol (AD). The reaction mixture is stirred at about 60° C until its isocyanate content is 4.4%. The melt is then heated to 120° C and urea is added. This reaction mixture is then stirred at 130° C until the melt is isocyanate-free.

The product is poured out onto a metal plate at 130° to 140° C.Its average molecular weight is 2225. The softening point of the product is in the region of 60° C. A melt is obtained at 87° C. The product can be broken down with a hammer or in a mill. The $SO_3^\ominus$ content of the solid oligourethane is 19 milliequivalents/100 g.

The granulated product can be dispersed in water at room temperature with the aid of a simple propeller stirrer (e.g. in an approximately 30% disperion) and 72 g of 30% aqueous formaldehyde may then be added. The process of dispersion is accelerated by employing elevated temperatures. The dispersion is finally heated to 70° C for 1 hour.

The resulting dispersion, which has no tendency to sedimentation, has a Ford cup viscosity (4 mm nozzle) of about 20 seconds. It dries to a transparant hard, clear film. It may be used as leather dressing.

Tensile strength: 250 kg wt/cm$^2$
Elongation at break: 220%
Shore A hardness: 62

EXAMPLE 2

Starting materials:
319 g of polypropylene oxide ether started on bisphenol A (molecular weight: (570) (PA);
58.2 g of propoxylated adduct of 2-butenediol-(1,4) and sodium bisulphite (molecular weight: 425) (AD) 75% is toluene;
32 g of polydimethylsiloxane containing 2 —CH$_2$OH end groups and having a hydroxyl content of 3% by weight;
174.1 g of hexamethylene-1,6-diisocyanate:
43.5 g of urea Method: see Example 1

The granulate is more freely pourable than the one obtained in Example 1. It is processed in a manner similar to that of Example 1. Softening point is in the region of about 70° C. It starts to melt at 85° C. Its average molecular weight is 1690. The $SO_3^\ominus$ group content of the solid oligourethane is 16.8 milliequivalents per 100 g.

The solid "disperses" readily in water at room temperature to form a dispersion and can be cross-linked in the aqueous phase as in Example 1. The film is hard and clear and its surface shows very little sliding friction.

EXAMPLE 3

Starting materials:
473.4 g of a polyester of phthalic acid, adipic acid and ethylene glycol* (molecular weight: 1657) (PAA)
73.43 g of propoxylated adduct of 2-butenediol-(1,4) and sodium bisulphite (molecular weight: 425) (AD) 75% in toluene 97.66 g of hexamethylene-1,6-diisocyanate
20.94 g of urea

* The ethylene oxide units contained in these polyesters make virtually no contribution to the hydrophilic character of the oligourethane and are therefore not included in the calculation of the ethylene oxide units which are essential to the invention. The ethylene oxide units on which the calculation of the relevant ethylene oxide unit content is based are exclusively ethylene oxide units situated within a polyalkylene-polyether chain.

Method: See Example 1

The solid begins to soften at 69° C. It exists as a melt at 86° C. Its average molecular weight is 3860. The $SO_3^\ominus$ group content of the solid oligourethane is in the region of 20 milliequivalents per 100 g. When cold, the product is dispersed in deionized water at room temperature to form a 30% dispersion (a 50% dispersion, for example, is also possible), 80 g of formaldehyde (30% aqueous solution) are added and the product is briefly heated to 70° C.

A dispersion having a viscosity of about 20 cP is obtained. It shows the Tyndall effect in transmitted light.

The dispersion may be used for impregnating leather. It dries to a clear, translucent elastic film.

EXAMPLE 4

Starting materials:
473.4 g of a polyester of phthalic acid, adipic acid and ethylene glycol (molecular weight: 1657) (PAA)
73.4 g of propoxylated adduct of 2-butenediol-(1,4) and solium bisulphite (molecular weight: 425) (AD) 75% in toluene
86.7 g of a 65:35 mixture of tolylene-2,4- and -2,6-diisocyanate isomers (T 65).
10.5 of urea

Method

Diisocyanate T 65 is added at 60° C to the ester (PE) which has been dehydrated under vacuum at 120° C and the sulphonate diol (AD) and the mixture is left to react at this temperature until its isocyanate content is 1.9%. The reaction time is about 2.5 hours. The mixture is then heated to 120° C and urea is added to the melt. It is then stirred for about one hour at about 135° C. The hot melt is then poured out on to a metal sheet and cooled to room temperature. The softening point is in the region of 106° C. The average molecular weight is 7400. The $SO_3^\ominus$ group content of the solid oligourethane is 20.7 milliequivalent/100 g.

100 g of the solid substance are dispersed in 233 g of water at room temperature. 15 g of 30% aqueous formaldehyde are added. After a brief period of heating to 70° C, the dispersion is cast to form a clear, hard film which is insoluble in water.

EXAMPLE 5

Starting materials:
351.5 g of a polyester of phthalic acid and ethylene glycol (OH number 287) (PA)
51 g of an adduct of sodium bisulphite on propoxylated 2-butenediol-(1,4) (molecular weight: 425) (AD),
239.9 g of hexamethylene diisocyanate (H)
51.4 g of urea

Method

The diisocyanate (H) is added at 40° C to the diols (PA) and (AD) which have been dehydrated at 120° C and the reaction mixture is left to react at 60° C until it reaches an isocyanate content of 6%. It is then heated to 120° C and the urea is added. Stirring is then continued for one hour at 135° C. The hot melt is then poured on to a metal sheet and cooled to room temperature. The softening point is 92° C. A melt is obtained at 118° C. The average molecular weight is 1620. The $SO_3^\ominus$ group content of the solid oligourethane is 17.3 milliequivalents per 100 g.

100 g of the solid material are dispersed in 233 g of water at room temperature. 70 ml of 30% formaldehyde are added. The dispersion is briefly heated to 70° C and then cast to form a film. The film is clear and solid and no longer soluble in water. The Ford cup viscosity (4 mm) of the dispersion is 11.3 seconds.

EXAMPLE 6

Starting materials:
319 g of polypropylene oxide ether (OH number 197) (PPA) which has been started on bisphenol A
124 g of dispersing agent A
175.7 g of hexamethylene-1,6-diisocyanate
54.3 g of urea.

Dispersing agent A

The reaction product of a polyethylene oxide ether which has been started on butanol and hexamethylene-1,6-diisocyanate (NCO/OH = 2:1) is reacted to undergo an addition reaction with N,N-diethanolamine (NCO/NH = 1:1). The molecular weight of the product is 2250. The ethylene oxide content is approximately 88% by weight.

Method

The polyether (PPA) and dispersing agent A are dehydrated. Hexamethylene-1,6-diisocyanate is added at 60° C. The prepolymer is left to react at this temperature until it has an isocyanate content of 5.9%. It is then heated to 120° C and urea is stirred in. After a reaction time of one hour at 135° C, the hot melt is poured out on to a plate and cooled to room temperature. The softening point of the solid product is 60° C. It forms a melt at 82° C. The average molecular weight is 1490. The oligourethane contains 16% by weight of ethylene oxide units within the polyalkylene oxide chain.

100 g of the solid substance are dispersed in 233 g of water at room temperature and 30 g of 30% aqueous formaldehyde are added. After brief heating to 70° C, the dispersion is cast to form a film which is clear and hard. The dispersion is suitable for use as leather dressing.

The solids content of the dispersion is 29.5%. The Ford cup viscosity (4mm) is 14.0 seconds.

EXAMPLE 7

Starting materials:
285 g of a polypropylene oxide ether (OH number 197) (PPA) which has been started on bisphenol A
70.8 g of propoxylated adduct of 2-butenediol-(1,4) and sodium bisulphite (molecular weight: 425) (AD) 72% in toluene
145.8 g of hexamethylene-1,6-diisocyanate
46.3 g of N,N-dimethyl ethanolamine Method: see Example 1

The average molecular weight is 2031. The $SO_3^\ominus$ group content of the solid oligourethane is 22.7 milliequivalents per 100 g. The softening point is 50° C. A melt is obtained at 62° C. The solid is readily dispersible in water at room temperature. The resulting solution forms a soft film. The solution is reacted with formaldehyde and heated to 70° C. The film obtained from this dispersion (solids content 30%) is only slightly harder.

The same finding was made in a similar experiment. In this case, however, the solid material had an average molecular weight of 3759 and a softening point of 78° C. A melt is in this case obtained at 100° C. The solid is less soluble in water but forms harder films. Reaction with formaldehyde causes only slightly hardening of the film.

EXAMPLE 8

Starting materials:
285 g of a polypropylene oxide ether (OH number 197) (PPA) started on bisphenol A
26.8 g of dimethylolpropionic acid (DMPA)
176.4 g of hexamethylene-1,6-diisocyanate (H)
44.1 g of urea

Method see Example 1

The softening point is 81° C. A melt is obtained at 102° C. The average molecular weight is 1450. The COO$^\ominus$ group content of the oligourethane is 37.6 milliequivalents per 100 g.

The solid is readily dispersible in water at room temperature if about 2.6 g of a 25% aqueous ammonia solution are added to 100 g of the solid. When the product has been dissolved, 18.6 g of a 30% aqueous formaldehyde solution per 100 g of solid are stirred in. The Ford cup viscosity (4 mm nozzle) is 25.6 seconds for a 38% solid. A film which has been heat treated at 140° C is hard and clear. The dispersion is suitable as finish for leather and textiles.

The solid can also be produced by first reacting the polyether (PPA) with the diisocyanate (H) and stirring in the diol compound (DMPA) when the isocyanate content reaches a value of 10.5% and then continuing the reaction until the isocyanate content is 6.0% before the urea is added. The melting point of the resulting solid substance is identical to that of the substance obtained by the first process.

EXAMPLE 9

Starting materials:
361 g of a polyester of adipic acid and butanediol (OH number 51.3) (PE)
54 g of dispersing agent B
16.2 g of N-methyl-diethanolamine
82.5 g of hexamethylene-1,6-diisocyanate (H)
20.9 g of urea

Dispersing agent B

The reaction product obtained by reacting a polyethylene oxide polyether which has been started on butanol and contains about 10% of polypropylene oxide groups with hexamethylene-1,6-diisocyanate (NCO/OH = 2:1) is reacted with N,N-diethanolamine to effect chemical addition (NCO/NH = 1:1). The molecular weight of the product is 2250. The ethylene oxide content is approximately 77% by weight.

Method

The polyester (PE) and dispersing agent B are dehydrated. N-methyldiethanolamine is first stirred in at 60° C, followed by the diisocyanate (H). The mixture is left to react at this temperature until the NCO content is 2.7% and urea is then added to the melt. The melt is then heated to 130° C for 1 hour and poured out on to a plate.

The softening point of the solid substance is 48° C. A melt is obtained at 56° C. The average molecular weight of the oligourethane is 3070. The concentration of ethylene oxide units built into the polyalkylene oxide chain is 7.7% by weight.

The product is readily dispersible in water at room temperature if 1.1 g of an 80% $H_3PO_4$ is dissolved in the water of dispersion for every 100 g of solid.

EXAMPLE 10

Starting materials:
414.3 g of a polyester of phthalic acid, adipic acid and ethylene glycol (OH number 268) (PAA)
65.2 g of propoxylated adduct of 2-butenediol-(1,4) and sodium bisulphite (molecular weight: 425) (AD), 75% in toluene
67.5 g of hexamethylene-1,6-diisocyanate
4.6 g of urea

Method see Example 6

The softening point of the solid is 82° C. A melt is obtained at 102° C.

The average molecular weight is 16520. The $SO_3^\ominus$ group content of the solid oligourethane is 21.5 milliequivalents per 100 g.

The product is substantially dispersible in water at room temperature but dissolves much less easily than an oligomer with a lower molecular weight. About 5% of this solid remains behind undissolved after about 20 hours stirring.

EXAMPLE 11

Starting materials:
319 g of a polypropylene oxide ether (OH number 197) (PPA) started on bisphenol A
45 g of dispersing agent B
41.3 g of propoxylated adduct of 2-butenediol-(1,4) and sodium bisulphite (molecular weight 425 (AD), 72% in toluene)
174.7 g of hexamethylene-1,6-diisocyanate
49.1 g of urea

Dispersing Agent B

The reaction product obtained by reacting a polyethylene oxide polyether which has been started on butanol and contains about 10% of polypropylene oxide groups with hexamethylene-1,6-diisocyanate at an NCO/OH ratio of 2:1 is reacted to effect chemical addition with N,N-diethanolamine (NCO/NH = 1:1). The molecular weight is 2250. The ethylene oxide content is approximately 77% by weight.

Method see Example 1

The solid softens at 60° C and forms a melt at 82° C. Its average molecular weight is 1509. 20.5 g of an aqueous formaldehyde solution (30%) are added to 200 g of a 30% dispersion. The Ford cup viscosity (4 mm nozzle) of this dispersion is 13 seconds. The film heat treated at 140° C is very hard and clear. The product is suitable for use as leather dressing.

EXAMPLE 12

Starting materials:
319 g of a polypropylene oxide ether (OH number 197) (PPA) started on bisphenol A 58.4 g of a propoxylated adduct of 2-butenediol-(1,4) and sodium bisulphite (molecular weight 425 (AD), 75% in toluene)

155.9 g of hexamethylene-1,6-diisocyanate (H)

41.26 g of glycidol

Method

The polyether PPA and diol (AD) are dehydrated and reacted with the diisocyanate (H) at 60° C. Glycidol is stirred into the melt when an isocyanate value of 4.3 is reached (20 hours). The melt is then heated to temperatures of from 100° C to 110° C for one hour and poured out on to a plate.

The softening point is about 50° C. A melt is obtained at 62° C. The average molecular weight is 2008.

The solid substance is readily dispersible in water at room temperature. The uncross-linked film of this dispersion is tacky. 1.7 g of diethylene triamine are added to 200 g of a 30% dispersion. The solids content of this highly viscous, cross-linked dispersion is 33%. The film is soft but dry. Its volumetric expansion in water is only 6% after 24 hours.

EXAMPLE 13

Starting materials:

90.75 g of a propoxylated adduct of 2-butenediol-(1,4) and sodium bisulphite (molecular weight 425 (AD), 84.3% in acetone)

135 of butane-1,4-diol (BD)

564.5 g of hexamethylene-1,6-diisocyanate (H)

215.6 g of ethanolamine

Method

The adduct (AD) is freed from acetone and mixed with butanediol at 80° C. The diisocyanate (H) is slowly added to the homogeneous mixture at 50° C. When the isocyanate content reaches 18% (about 2 hours at 55° C), ethanolamine is added dropwise at 60° C. The reaction is strongly exothermic. The melt is heated to 130° C for 20 minutes and then poured out on to a plate while still hot.

The solid softens at 142° C and forms a melt at 150° C. the calculated average molecular weight is 562.

The solid is readily dispersible in water at room temperature. A dispersion with a solids content of 15% has a Ford cup viscosity (4 mm nozzle) of 11 seconds.

What is claimed is:

1. A process for the production of polyurethane films and coatings from oligomeric polyurethane prepolymers which are free from isocyanate groups and cross-linking agents comprising:
   (a) contacting solid oligomeric polyurethane prepolymers which are free from isocyanate groups in the form of lumps or coarse powders with water at a temperature below the softening point of the prepolymer to form a dispersion, said oligomeric polyurethane prepolymers characterized in that
      (1) they have an average molecular weight of less than about 20,000,
      (2) they contain at least about 4 to 120 milliequivalents of ionic groups per 100 grams of prepolymer, said milliequivalents of ionic groups derived from groups selected from the group consisting of ionic groups and groups capable of conversion into ionic groups before, during or after said prepolymers are brought into contact with water, or at least about 2 to 20% by weight of hydrophilic units of the formula —$CH_2$—$CH_2$—O—, and
      (3) they are solid at room temperature,
   (b) applying the dispersion to a substrate,
   (c) cross-linking the oligomeric polyurethane prepolymer by the addition of a cross-linking agent to the dispersion, said addition being before, during or after the application of the dispersion to said substrate and,
   (d) drying said dispersion.

2. The process of claim 1, wherein the oligomeric polyurethane prepolymers are synthesized by an isocyanate polyaddition process from
   (a) isocyanates selected from the group consisting of diisocyanates and triisocyanates, and
   (b) compounds containing at least one group which is capable of undergoing an addition reaction with isocyanate groups.

3. The process of claim 2 wherein components (a) or (b) include compounds selected from the group consisting of compounds containing ionic groups, compounds containing groups capable of conversion into ionic groups, compounds containing ionic groups and groups capable of conversion into ionic groups, compounds containing hydrophilic units of the formula —$CH_2$—$CH_2$—O— and compounds, which in addition to containing at least one group capable of reacting with isocyanate groups, contain reactive groups which are not reactive with isocyanate groups under the addition reaction conditions but are capable of a cross-linking reaction with a cross-linking agent.

4. The process of claim 1 wherein the oligomeric polyurethane prepolymers have a molecular weight of less than about 10,000.

5. The process of claim 1 wherein the oligomeric polyurethane prepolymer contains from about 4 to 30 milliequivalents per 100 grams of prepolymer of ionic groups and from about 3 to 17% by weight of ethylene oxide units —$CH_2$—$CH_2$—O—.

6. The process of claim 1 wherein the proportion by weight of oligomeric polyurethane prepolymer to water is between about 65:35 and 5:95.

7. The process of claim 1 wherein the dispersion is formed at temperatures of from about 1° C to 150° C.

8. The process of claim 1 wherein the cross-linking agent is selected from the group consisting of formaldehyde and aqueous solutions of compounds which release formaldehyde.

9. The process of claim 2 wherein monoisocyanates are used in combination with the isocyanates selected from the group consisting of diisocyanates and triisocyanates.

* * * * *